US006680103B1

(12) United States Patent
Sloat et al.

(10) Patent No.: US 6,680,103 B1
(45) Date of Patent: Jan. 20, 2004

(54) PACKAGING MATERIAL AND METHOD

(75) Inventors: Jeffrey T. Sloat, Broomfield, CO (US); William D. Gilpatrick, Broomfield, CO (US)

(73) Assignee: Graphic Packaging International, Inc., Marietta, GA (US)

( * ) Notice: Subject to any disclaimer, the term of this patent is extended or adjusted under 35 U.S.C. 154(b) by 0 days.

(21) Appl. No.: 09/685,484

(22) Filed: Oct. 10, 2000

(51) Int. Cl.[7] .......................... B32B 23/02; B32B 3/00; B32B 27/04

(52) U.S. Cl. .................. 428/195.1; 428/204; 428/300.7

(58) Field of Search .............................. 428/195, 195.1, 428/204

(56) References Cited

U.S. PATENT DOCUMENTS

| | | | | |
|---|---|---|---|---|
| 3,196,038 A | | 7/1965 | Schoch et al. | |
| 3,463,659 A | | 8/1969 | Dragoon et al. | 117/71 |
| 4,233,195 A | | 11/1980 | Mills | 260/23 S |
| 4,521,492 A | | 6/1985 | Allen | 428/464 |
| 4,757,930 A | | 7/1988 | Ditto | 226/27 |
| 4,781,317 A | | 11/1988 | Ditto | 226/27 |
| 5,091,236 A | | 2/1992 | Keller et al. | |
| 5,092,516 A | | 3/1992 | Kastanek | 229/226 |
| 5,799,978 A | * | 9/1998 | Grinnell | 281/29 |
| 5,837,383 A | | 11/1998 | Wenzel et al. | |
| 5,989,696 A | * | 11/1999 | McCarthy et al. | 428/288 |
| 5,632,404 A | | 4/2000 | Walsh | 229/5.81 |

FOREIGN PATENT DOCUMENTS

| | | |
|---|---|---|
| DE | 1461247 | 1/1970 |
| EP | 0313356 A | 4/1989 |
| JP | 54050575 A | 4/1979 |
| JP | 04080745 A | 3/1992 |

OTHER PUBLICATIONS

U.S. patent application Publication No. US 2002/0114933 A1 published Aug. 22, 2002 for “Grease Masking Packaging Materials And Methods Thereof” of Gould.

* cited by examiner

*Primary Examiner*—Cynthia H. Kelly
*Assistant Examiner*—L. Ferguson
(74) *Attorney, Agent, or Firm*—Kaas, Law, O’Meara & Malkin, P.C.; Michael A. Goodwin, Esq.

(57) ABSTRACT

An improved packaging material may include a substrate which is normally susceptible to permeation by substances such as oil or grease. A colorant layer may be applied to the outer surface of the substrate. The colorant layer may be of a color chosen to closely resemble or to overpower the appearance of a stain on the substrate which would otherwise be caused by the substances. In this manner, the colorant layer serves to mask the stain which would otherwise be caused by substances permeating through the substrate. A second colorant layer may optionally be provided over the first colorant layer to provide a uniform background of a desired color. Graphics, e.g, text and/or images, may then be applied to the first or second colorant layer in a conventional manner.

7 Claims, 2 Drawing Sheets

PACKAGING MATERIAL AND METHOD

FIELD OF THE INVENTION

The present invention relates generally to packaging material used to form packages for products and, more specifically, to packaging material having the ability to mask stains caused by the product being packaged.

BACKGROUND OF THE INVENTION

Products, and in particular food products, are commonly packaged in paperboard boxes or cartons. Examples of such paperboard boxes or cartons include cereal boxes, milk cartons, butter and margarine boxes and beer and soft drink secondary packaging (e.g., paperboard cartons enclosing a plurality of beer or softdrink cans or bottles). For explanatory purposes, the simple term "cartons" may be used throughout this description to refer to the type of paperboard boxes or cartons described above.

The process of forming this type of carton typically begins by printing a continuous web of paperboard material with the particular graphics desired for the package in question. The paperboard material may, for example, have a thickness of between about 0.001 and about 0.040 inch. Before printing, the paperboard material may, for example, be of a brown or grey color. Alternatively, the paperboard material may be bleached or coated so as to exhibit a generally white color. A typical web of paperboard material may, for example, have a length of between about 10,000 and about 30,000 feet and may be wound into a roll format.

To print a web of material, the web of material may be mounted on a reel at one end of a web printing machine. Such a web printing machine typically includes various printing stations, each of the printing stations being adapted to apply a different pattern and color of ink to the web. Each printing station may employ an ink application method such as a gravure or a flexographic method, as is well-known in the web printing industry. As can be appreciated, this type of printing machine will typically have a number of active printing stations equal to the number of graphics colors to be applied to the web. A drying station may also be located after each of the printing stations such that each color pattern will be dried before that portion of the web enters the next printing station.

The end of the web of material may then be threaded through the web printing machine and thereafter rewound onto an output reel at the opposite end of the printing machine. In this manner, the entire web may be fed through the printing machine. Within the printing machine, the graphics for the desired package are repeatedly printed along the web.

After printing is completed, the printed web is removed from the output reel of the printing machine and transferred to a cutting and scoring machine. The cutting and scoring machine cuts the web into a plurality of carton blanks, each of which is registered with the graphics printed in the printing machine. Examples of cutting and scoring machines are generally disclosed in U.S. Pat. No. 4,781,317 and U.S. Pat. No. 5,757,930, both of which are hereby incorporated by reference for all that is disclosed therein. Depending on the design of the particular carton blank, the blank may also be folded or partially folded and glued after completion of the cutting and scoring operation.

The carton blanks may then be shipped to the product filling location. Here, the carton blanks are erected the desired product inserted. Any necessary final gluing, depending on the type of carton, may also be accomplished at this time. Examples of carton blanks and of cartons formed therefrom are disclosed in U.S. Pat. No. 5,092,516 and U.S. Pat. No. 5,632,404, both of which are hereby incorporated by reference for all that is disclosed therein.

A problem arises when paperboard cartons are used to package products which contain fluids that are capable of permeating the paperboard. Examples of such problematic products include those which are oily or greasy, e.g., products such as butter or margarine. Specifically, oil or grease from such products can penetrate the paperboard of the carton and appear as a stain on the outside of the carton. Such staining detracts from the appearance of the carton and may interfere with the graphics printed thereon. One solution to this problem is to use a modified paperboard material. Such modified paperboard materials are generally treated with a chemical which makes the paperboard material impermeable to oil and grease. Although this type of material works well to prevent oil and grease migration, it is relatively expensive.

Another solution to the problem of oil and grease migration is proposed in U.S. Pat. No. 4,521,492, which is hereby incorporated by reference for all that is disclosed therein. This solution involves coating the paperboard material with a non-leafing metallic ink and a highly pigmented white ink prior to printing graphics onto the paperboard material. The use of metallic inks, however, is disadvantageous for several reasons. At the outset, metallic inks are relatively expensive and their use, thus, prohibitively adds cost to the package. Metallic inks also have a detrimental effect on printability; specifically, it is difficult to obtain good adhesion between a metallic ink layer and a subsequently applied ink layer. Finally, metallic inks are difficult to apply, often, for example, causing plugging of printing machine rollers.

Thus, it would be generally desirable to provide a solution to the problem of grease and oil migration staining in cartons that overcomes the problems associated with prior proposed solutions.

SUMMARY OF THE INVENTION

The present invention is generally directed to an improved packaging material. The packaging material may include a substrate which is normally susceptible to permeation by oil or grease. A non-white non-metallic colorant layer may be applied to the outer surface of the substrate. The specific color of the colorant layer may be chosen to closely resemble or to overpower the appearance of a stain on the substrate caused by oil or grease permeating through the substrate. In this manner, the colorant layer serves to mask the stain and, thus, to prevent the stain from appearing on the finished package.

A second non-metallic colorant layer may be provided over the first colorant layer to provide a uniform background of a desired color, e.g., white. Graphics, e.g, text and/or images, may then be applied to the second colorant layer in a conventional manner. Alternatively, the second colorant layer may be applied only in areas where no graphics are to be applied or may be applied in both areas where no graphics are to be applied and in areas where graphics of light color and/or low opacity are to be applied. As a further alternative, the second colorant layer may be omitted entirely and the color of the first colorant layer may be used as the background color for the package.

It has been found that, in many cases, oil or grease cause a grey-colored stain on a substrate. Accordingly, a grey colored first colorant layer may be used to mask such a stain. In the case where the colorant is an ink, such a grey colorant may be formed from a white ink having a black pigment mixed therein.

The colorant layers may be applied in any conventional manner. In the case where the colorant is an ink, for example, the ink may be applied in a conventional web printing machine. The first printing station of the web printing machine may be modified to apply a substantially continuous layer of ink, rather than graphics. Where a second layer is also to be provided, the second station of the printing machine may also be modified to apply a substantially continuous layer of ink. The remaining stations in the printing machine may operate in a conventional manner.

DETAILED DESCRIPTION OF THE INVENTION

Figure 1:
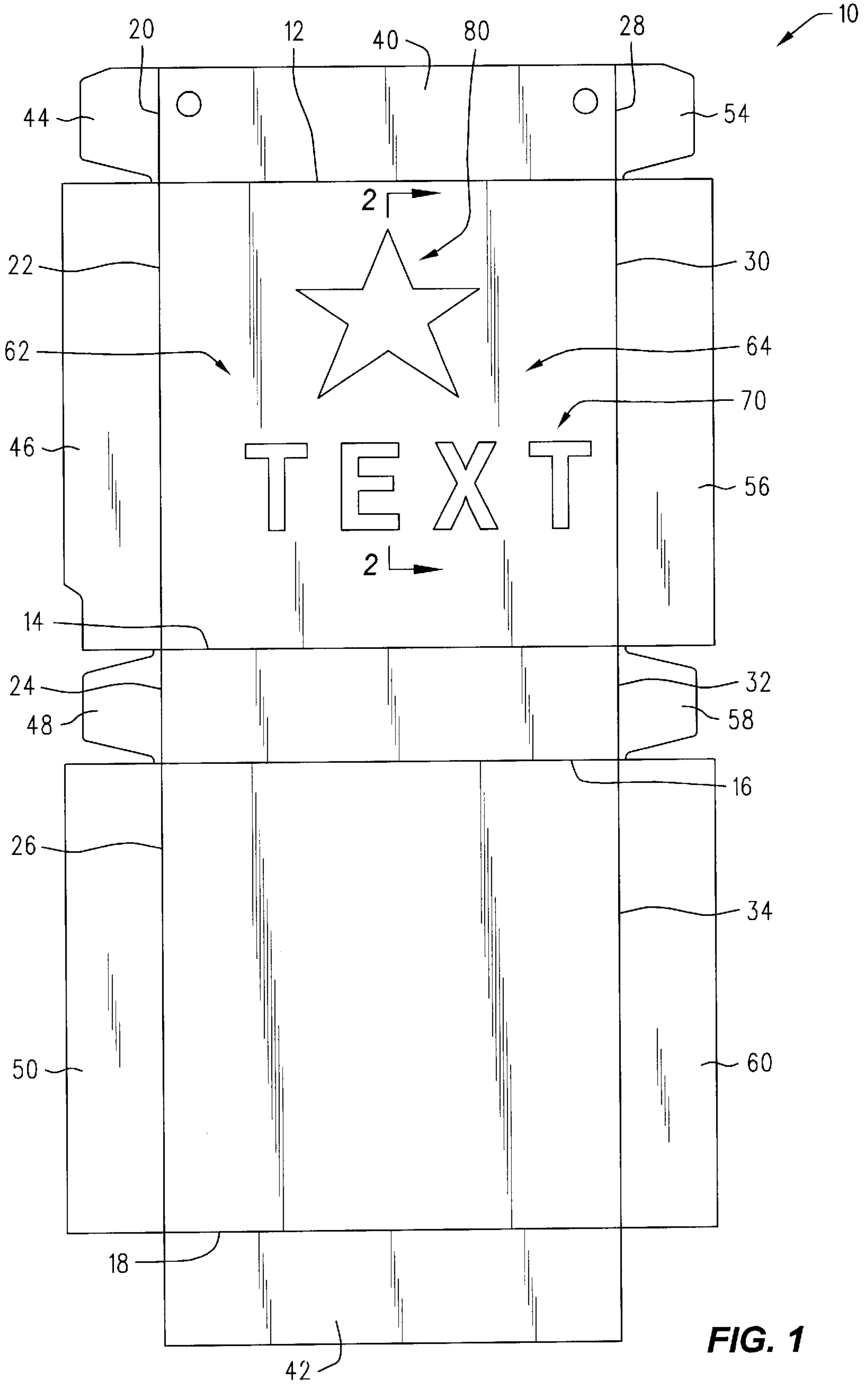
FIG. 1 is a top plan view of a carton blank formed from a packaging material having stain masking abilities.
Figure 2:
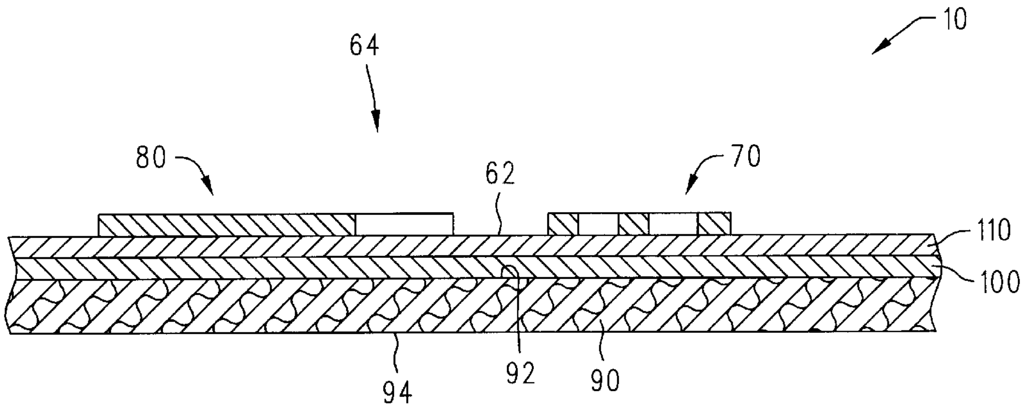
FIG. 2 is a cross-sectional elevational view taken along the line 2—2 of FIG. 1.
Figure 3:
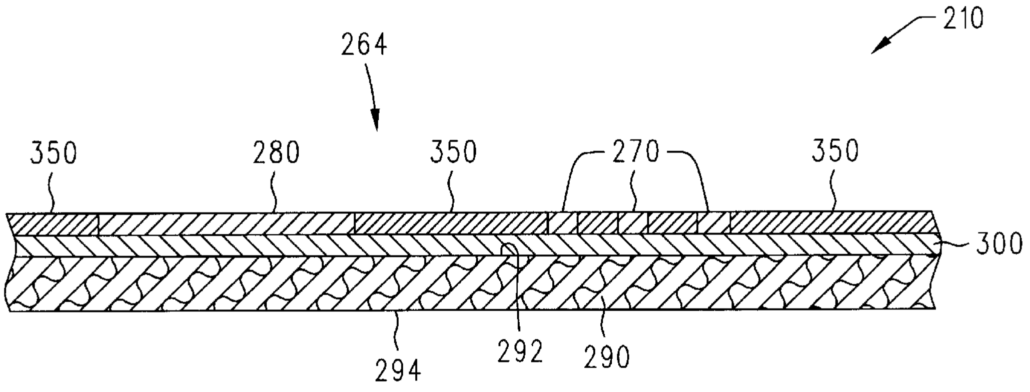
FIG. 3 is a cross-sectional view similar to that of FIG. 2, but illustrating an alternative embodiment.

FIGS. 1–3, in general, illustrate a packaging material 10, 210 for packaging grease or oil-containing substances. The packaging material 10, 210 may include a substrate 90, 290 which is normally susceptible to permeation by oil or grease. The substrate may have a first surface 92, 292 thereon. The packaging material 10, 210 may further include graphics 64, 264 and at least one colorant layer 100, 300 located between the graphics 64, 264 and the first surface 92, 292 of the substrate 90, 290. The at least one colorant layer 100, 300 may comprise a non-metallic non-white colorant.

FIGS. 1–3, further illustrate, in general, a method of making a packaging material 10, 210 for packaging a grease or oil-containing product. The method may include providing a substrate 90, 290 which is normally susceptible to permeation by oil or grease and applying at least one layer 100, 300 of non-metallic non-white colorant to a first surface 92, 292 of the substrate 90, 290.

FIGS. 1–3, further illustrate, in general, a method of making a packaging material 10, 210 for packaging a grease or oil-containing product. The method may include providing a substrate 90, 290 which is normally susceptible to permeation by oil or grease from the product and to staining thereby; applying a first layer 100, 300 of colorant to a first surface 92, 292 of the substrate 90, 290 and choosing the color of the colorant based upon the color of the staining of the substrate 90, 290 caused by the oil or grease from the product.

Having thus described the packaging material and method in general, they will now be described in further detail.

FIG. 1 illustrates a carton blank 10. Carton blank 10 may be formed having a plurality of fold lines, such as the fold lines 12, 14, 16, 18, 20, 22, 24, 26, 28, 30, 32 and 34 (such fold lines are also sometimes referred to in the carton industry as "score lines"). These fold lines define end panels 40 and 42 and side panels 44, 46, 48, 50, 54, 56, 58 and 60. The carton blank 10 may be shaped and configured such that it can be erected, in a generally conventional manner, into a carton for containing a product. Specifically, to erect the carton blank 10 into a carton, the carton blank 10 may be folded about the fold lines 12, 14, 16 and 18 and the end panels 40 and 42 glued to one another. A product, e.g., sticks of margarine or butter, may then be slid into the carton through one of the open sides.

After the product has been inserted, the sides may be sealed. Specifically, the side panels 44 and 48 may be folded inwardly about the fold lines 20 and 24, respectively. The side panels 46 and 50 may then be folded inwardly about the fold lines 22 and 26, respectively, and glued to one another. In a similar manner, the side panels 54 and 58 may be folded inwardly about the fold lines 28 and 32, respectively. The side panels 56 and 60 may then be folded inwardly about the fold lines 30 and 34, respectively, and glued to one another. In this manner, a fully enclosed carton may be formed for housing a product to be marketed.

Referring again to FIG. 1, the carton blank 10 may include graphics 64 applied thereto. The graphics 64 may include text 70 and/or images 80. Such graphics may serve to identify the product contained within the carton to a consumer or potential consumer. The graphics 64 also may serve to produce an appearance for the overall package which is aesthetically pleasing to a consumer or potential consumer. It is noted that the graphics 64 are illustrated in FIG. 2 on only one panel 62 of the carton blank 10 for purposes of illustrative clarity. It is to be understood, however, that, in actual use, several or all of the panels of the carton blank 10 may include graphics in a conventional manner.

FIG. 2 is a partial cross-sectional view of the carton blank 10, taken along the line 2—2 in FIG. 1. Referring to FIG. 2, the carton blank 10 may include a paperboard substrate having an outer surface 92 and an inner surface 94. Paperboard substrate 90 may, for example, be of the type known in the industry as a "solid bleached sulfite" or "SBS" paperboard. The entire composition of this type of substrate, including the outer surface 92, is of a white color. Paperboard substrate 90 may, for example, have a thickness of about 0.012 inch. As can be appreciated, the inner surface 94 of the substrate 90 also forms the lower surface of the carton blank 10 and, thus, will form the inner surface of a carton erected from the carton blank 10. Accordingly, the inner surface 94 is the surface of the erected carton that contacts the product to be packaged within the carton. This contact may either be direct or via supplemental product packaging, e.g., wax paper, in which the actual product may be packaged.

As discussed previously, a problem arises when paperboard cartons are used to package products which contain fluids that are capable of permeating the paperboard. Examples of such problematic products include those which are oily or greasy, e.g., products such as butter or margarine. Specifically, oil or grease from such products can penetrate the paperboard of the carton and appear as a stain on the outside of the carton. Such staining detracts from the appearance of the carton and may interfere with the graphics appearing thereon.

The carton blank 10 overcomes this problem in a manner as will now be discussed in detail. It has been discovered that the staining described above appears as a darkened area on the outer surface 92 of the substrate 90. It has further been discovered that the appearance of such staining can be masked by applying to the outer surface 92 a layer of non-metallic non-white colorant having substantially the same color as the stain.

It has been found, for example, that oil and grease stains on solid bleached sulfite paperboard appear having a grey color. Accordingly, this type of stain can be masked by applying a layer of non-metallic grey colorant between the graphics 64 and the substrate 90 in a manner as will be described in further detail below. The layer of grey colorant, thus, serves to mask the appearance of grease or oil stains and thus, prevent such stains from interfering with the appearance of a carton formed from the carton blank 10.

It is noted that the term "colorant" is used herein to denote any substance designed to impart color to a surface. The term colorant, thus, is intended to include, for example, inks, paints, dyes and stains.

It is further noted that the term "non-metallic" colorant is used herein to mean a colorant that does not contain any metallic elements in more than negligible/trace quantities (for example, those quantities that would incidentally be present as a result of the manufacturing processes to be employed). In other words, the non-metallic colorant described herein will not include any metallic elements aside from minute, trace amounts that would be considered inconsequential. As previously described, the use of metallic colorants, e.g., metallic inks, is disadvantageous in that such metallic colorants, for example, are relatively expensive, have a detrimental effect on printability and are difficult to apply. Accordingly, the use of a nonmetallic colorant is preferred.

In the carton industry, inks represent the most commonly used colorants. Typical inks generally include a carrier, a binder and a pigment. The carrier serves to carry the other components and is intended to evaporate after the ink is applied, thus causing the ink to dry. Carriers may be either water or solvent based. Some inks, known generally in the industry as "energy curable inks" utilize a reactive diluent instead of a carrier. Rather than evaporating, as does a conventional carrier, a reactive diluent polymerizes and becomes part of the cured ink film after the energy curable ink is exposed to an energy source, e.g., ultraviolet light or electron beam radiation.

The ink pigment serves to impart the desired color to the ink. A typical pigment used in white ink, for example, is titanium dioxide. Typical pigments used in black ink include carbon and iron oxide. Colors other than white and black can, of course, be formulated by using a different pigment or a combination of pigments. The binder in an ink serves to adhere the pigment to the substrate onto which the ink is printed.

Referring again to FIG. 2, a first layer of non-metallic non-white colorant 100 may be applied directly to the paperboard substrate 90. The first layer 100 may, for example, be a grey colorant layer and may extend over the entire surface area of the carton blank 10. A second layer of non-metallic colorant 110 may be applied directly on the layer 100 as illustrated in FIG. 2. Second layer 110 may also extend over the entire surface area of the carton blank 10. Finally, the desired graphics 64 may be applied directly on the second layer 110. It is noted that FIG. 2 is not to scale and that, for purposes of illustration, the thickness of the colorant layers 100, 110 and the graphics 64 has been exaggerated relative to the thickness of the substrate 90. As described in further detail herein, in actuality, the thickness of the colorant layers 100, 110 and the graphics 64 is much less than the thickness of the substrate 90.

First colorant layer 100 may, for example, have a thickness of between about 1 and about 8 microns and, more preferably, between about 2 and about 4 microns. Most preferably, the first colorant layer 100 may have a thickness of about 3 microns. First colorant layer 100 may, for example, be formed having a grey color in order to mask a grey colored stain, as described above.

First colorant layer 100 may, for example, be formed from a grey ink which is formed by mixing a black ink and a white ink. The black ink, for example, may include a conventional water based carrier, a conventional binder, and a carbon pigment. The black ink may, for example, be of the type produced by Progressive Ink Company, LLC of 4150 Carr Lane Court, St. Louis, Mo. 63119 and identified as formula number WBJ9004.

The white ink, for example, may include a conventional water based carrier, a conventional binder, and a titanium dioxide pigment. The white ink may, for example, be of the type produced by Progressive Ink Company, LLC of 4150 Carr Lane Court, St. Louis, Mo. 63119 and identified as formula number WBJ1000.

To produce the exemplary grey ink described above, the black and white inks described above may be mixed together. Specifically, the black ink may have a concentration of between about 0.01 percent and about 15 percent by weight of the total black ink/white ink mixture. More preferably, the black ink may be introduced at a concentration of between about 1 percent and about 10 percent by weight of the total black ink/white ink mixture. Most preferably, the black ink may be introduced at a concentration of about 2 percent by weight of the total black ink/white ink mixture.

It is noted that, as used herein, the term "non-white colorant" means a colorant having any non-white color element included therein. The grey ink described above, for example, is one example of a "non-white colorant". Although this ink includes a white pigment (e.g., titanium dioxide), it is considered to be a "non-white colorant" because it also includes a non-white (i.e., black in this case) pigment. In a similar manner, an ink that includes a non white color pigment (e.g., blue or green) and no white pigment would also be considered to be a "non-white colorant" for purposes of this discussion.

The grey ink described above, when used as the first colorant layer 100, serves to mask oil and/or grease stains caused by product packaged within a carton and to prevent such stains from appearing on the outer surface of the carton. As described above, it has been discovered that most oil and grease stains are visible through graphics applied to cartons because of the darkening created from the stains. Rather than acting as a barrier, the colorant layer 100 serves to mask the stain by either closely resembling the stain color or by overwhelming the stain with colorant of a darker color. The colorant layer 100, thus, serves to mask or hide the stain rather than to block or prevent it. The use of a non-metallic grey ink for the colorant layer 100 to mask stains, as described herein, is advantageous due to ease of production in producing a grey-colored ink and the absence of the need for any expensive fillers or metal based powders.

It is noted that the specific configuration of the carton blank 10, as illustrated in FIG. 1, is described herein for exemplary purposes only. The stain masking attributes of the present invention may, of course, be used in conjunction with any package configuration.

The first colorant layer 100 may, alternatively, be formed from colorant which is entirely black. Although such a black colorant layer has been found to mask stains well, it may show through the second colorant layer 110. When, for example, a white second colorant layer 110 is used, the use of black first colorant layer 100 may cause the second colorant layer to appear grey, rather than white. This grey appearance may be undesirable in some situations. The use of a grey colorant, rather than a black colorant for the first colorant layer 100 overcomes this potential problem while still providing adequate stain masking ability.

Referring to FIGS. 1 and 2, it can be appreciated that the second colorant layer 110 will be visible in areas where no graphics 64 have been applied. Accordingly, the second colorant layer 110 serves to provide a uniform background color for the carton blank 10. Second colorant layer 110 may have a thickness of between about 1 and about 8 microns and most preferably about 4 microns.

Second colorant layer 110 may, for example, be formed from a white ink comprising, e.g., a conventional water based carrier, a conventional binder, and a titanium dioxide pigment. The white ink may, for example, be of the type produced by Progressive Ink Company, LLC of 4150 Carr Lane Court, St. Louis, Mo. 63119 and identified as formula number 1N002. Although the white colorant described above has been found to work well, a differently colored colorant may be substituted in order to provide a background having any desired color.

As an alternative to applying the second colorant layer 110 over the entire surface of the first colorant layer 100, the second colorant layer 110 may be omitted in areas where graphics having high opacity are to be applied.

Further, if a grey (the color of the colorant layer 100) background is desired, the second colorant layer 110 may be omitted entirely and the graphics 64 applied directly on the grey colorant layer 100.

The carton blank 10 may, for example, be formed in a conventional carton-making process. Such a conventional process may begin with a web printing machine which applies printing inks to a moving web of substrate material. Specifically, a continues web of paperboard material may be provided having a thickness and composition identical to that of the carton blank substrate layer 90 described above. The web of material may be mounted on a reel, in a conventional manner, and rotatably mounted near one end of a conventional web printing machine. Such web printing machines typically include various printing stations, each of the printing stations being adapted to apply a different pattern and color to the web. Each printing station may employ an application method such as lithographic, rotogravure or flexographic printing, as is well-known in the industry. As can be appreciated, such a conventional printing machine will typically have a number of active printing stations equal to the number of graphics colors to be applied to the web. A drying station may also be located after each of the printing stations such that each color pattern will be dried before that portion of the web enters the next printing station.

The end of the web may be threaded through the web printing machine and then rewound onto an output reel at the opposite end of the printing machine. The web printing machine may be of the type conventionally used to print graphics onto a moving web of material, except that the first two printing stations of the machine may be modified as follows.

Rather than printing graphics, as in a conventional printing station, the first printing station may be configured to apply a continuous layer over substantially the entire upper surface of the web. This layer will become the first layer 100, as previously described with respect to FIG. 2. Accordingly, the first printing station may be provided, for example, with grey or black ink as previously described in conjunction with the first layer 100.

In some cases, multiple carton blank patterns are printed across the width of a web, with spaces existing between adjacent patterns. In this case, in order to reduce ink waste, the first printing station may, alternatively, be configured to print the first layer 100 only in the areas where the carton blank patterns exist and not in the spaces therebetween. Since the first ink layer 100 will be omitted only in these relatively small spaces, the first layer 100 will still extend over substantially the entire upper surface of the web. For purposes of this description, such substantially complete coverage is considered to constitute a continuous layer of colorant.

In a similar manner to the first printing station, the second printing station may also be configured to apply a continuous layer over substantially the entire upper surface of the web. This layer will become the second layer 110, as previously described. Accordingly, the second printing station may, for example, be provided with white ink as previously described in conjunction with the second layer 110. Alternatively, as described above, in the case where multiple carton blank patterns are printed across the width of a web, the second printing station may be configured to print the continuous layer only in the areas where the carton blank patterns exist and not in the spaces existing therebetween. As described above, in some cases, it may be desired to omit the second layer 110 (and print the graphics directly on the first layer 100). In this situation, the second printing station may be omitted from the printing machine.

After the first and second (if used) printing stations, a third printing station may be provided in order to print a first color of graphics onto the second layer 110 (or directly onto the first layer 100 if the second layer 110 is not used). A fourth printing station may be provided in order to print a second color of graphics onto the second layer 110 (or directly onto the first layer 100 if the second layer 110 is not used), and so on until the desired number of graphics colors have been applied.

At the output of the printing machine, the web may be rewound onto an output reel in a conventional manner. After the web has been printed it may be removed from the output reel of the printing machine and transferred to a conventional cutting and scoring machine. There, the web may be transformed in a conventional manner into a plurality of carton blanks, such as the carton blank 10, described above.

Accordingly, a packaging material having stain masking abilities has been disclosed that does not require the use of expensive and problematic metallic inks.

It is noted that a specific manufacturing process for the carton blank 10 has been described above for exemplary purposes only. In practice, the steps described above could be performed in a different order or a different process entirely could be used to form the carton blank 10, having the various colorant layers and graphics as described.

FIG. 3 is similar to FIG. 2, but illustrates an alternative embodiment of a carton blank having stain-masking ability. FIG. 3 illustrates a carton blank 210 which may be substantially identical to the carton blank 10 previously described except for the colorant layers as will now be described in detail. With reference to FIG. 3, carton blank 210 may include a paperboard substrate 290 having an outer surface 292 and an inner surface 294. Paperboard substrate 290 may, for example, be substantially identical to the paperboard substrate 90 previously described with respect to FIG. 2.

Referring again to FIG. 3, a layer of non-metallic non-white colorant 300 may be applied directly on the outer surface 292 of the paperboard substrate 290. The colorant layer 300 may be identical to the colorant layer 100 previously described with respect to FIGS. 1 and 2.

Graphics 264, including text 270 and/or images 280, may be applied directly on the colorant layer 300. The embodiment of FIG. 3 differs from that of FIG. 2 in that a background colorant 350 may be applied directly on the first colorant layer 300 in areas where no graphics have been applied. In this manner, the background colorant 350 gives the visual impression of a uniform background layer. Applying the colorant 350 only in the areas where no graphics have been applied, however, requires the use of less colorant, e.g., ink, than does a continuously applied background colorant layer, such as the layer 110, FIG. 2, since the colorant 350 need not be applied in the areas where graphics exist. It is noted that, in a similar manner to FIG. 2, FIG. 3 is not to scale and, for purposes of illustration, the thickness of the colorant layer 300 and the graphics 264 has been exaggerated relative to the thickness of the substrate 290. As described in further detail herein, in actuality, the thickness of the colorant layer 300 and the graphics 264 is much less than the thickness of the substrate 290.

The colorant 350 may have a thickness of between about 1 and about 8 microns and, most preferably, about 4 microns. The colorant 350 may be of any color desired for the background of the particular package in question. Colorant 350 may, for example, be formed from a white ink comprising, e.g., a conventional water based carrier, a conventional binder, and a titanium dioxide pigment. The white ink may, for example, be of the type produced by Progressive Ink Company, LLC of 4150 Carr Lane Court, St. Louis, Mo. 63119 and identified as formula number 1N002.

The carton blank 210 may, for example, be formed in a manner similar to that previously described with respect to the carton blank 10. When printing the web for the carton blank 210, however, only the first printing station need be configured to apply a layer over substantially the entire upper surface of the web. This layer will become the layer 300, as previously described. Accordingly, the first printing station may, for example, be provided with grey or black ink as previously described in conjunction with the colorant layer 100.

Another printing station in the printing machine may be configured to print the desired pattern for the background colorant 350, FIG. 3. As previously discussed, this pattern may correspond to areas where graphics are not printed. Accordingly, this printing station may be provided, for example, with ink of the color desired for the background of the carton.

Further printing stations may be provided in order to print the graphics 264, as desired, in a conventional manner. After printing, the web may be transformed into a plurality of carton blanks, in a manner as generally described with respect to the embodiment of FIG. 2.

It is noted that a specific manufacturing process for the carton blank 210 has been described above for illustration purposes only. In practice, the steps described above could be performed in a different order or a different process entirely could be used to form the various graphics and colorant layers.

It is also noted that, although the foregoing description is directed to oil or grease staining, the stain masking concepts disclosed herein could be equally applied to any other type of staining, e.g., staining caused by predominantly water based substances such as fruit juice, so long as the color of the first colorant layer is chosen to closely resemble the color of the stain induced by the substance.

It is further noted that, although the foregoing description is directed to a paperboard substrate, the stain masking attributes described herein are equally applicable to any other type of substrate which is permeable to oil, grease or other types of substances and, thus, subject to undesirable staining.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A packaging material for packaging grease or oil-containing substances, said packaging material comprising:

(a) a substrate which is susceptible to permeation by oil or grease, said substrate having a first surface thereon;

(b) graphics;

(c) at least one colorant layer located between said graphics and said first surface of said substrate;

(d) wherein said at least one colorant layer comprises a non-metallic non-white colorant;

(e) wherein said packaging material comprises a carton blank;

(f) a second colorant layer directly adjacent said at least one colorant layer; and (g) wherein said at least one colorant layer masks the appearance of grease or oil stains on said packaging material which stains are the result of grease or oil permeating said substrate from the surface thereof opposite said first surface.

2. The packaging material of claim 1 wherein said non-metallic non-white colorant is an ink.

3. The packaging material of claim 2 wherein said ink comprises a white pigment and a black pigment.

4. The packaging material of claim 2 wherein said ink is a grey ink.

5. The packaging material of claim 1 wherein said second colorant layer is a layer of white ink.

6. The packaging material of claim 1, wherein at least a portion of said graphics is directly adjacent at least a portion of said second colorant layer.

7. The packaging material of claim 1 wherein the color of said at least one colorant layer is chosen to closely resemble the color of said grease or oil stains on said packaging material.

* * * * *